United States Patent
Barron

(10) Patent No.: US 6,385,057 B1
(45) Date of Patent: May 7, 2002

(54) POWER CONVERSION SYSTEM AND METHOD OF POWER CONVERSION

(75) Inventor: Stuart Barron, Uniontown, AL (US)

(73) Assignee: Bartronics, Inc., Marion, AL (US)

( * ) Notice: Subject to any disclaimer, the term of this patent is extended or adjusted under 35 U.S.C. 154(b) by 0 days.

(21) Appl. No.: 09/774,108

(22) Filed: Jan. 31, 2001

(51) Int. Cl.⁷ .............................................. H02M 3/335
(52) U.S. Cl. ............................ 363/17; 363/48; 363/65
(58) Field of Search ............................. 363/17, 47, 48, 363/65, 71

(56) References Cited

U.S. PATENT DOCUMENTS

| | | | | |
|---|---|---|---|---|
| 4,062,057 A | * | 12/1977 | Perkins et al. | 363/71 |
| RE29,560 E | * | 2/1978 | Frank et al. | 363/71 |
| 5,432,695 A | * | 7/1995 | Vlatkovic et al. | 363/138 |
| 5,546,295 A | * | 8/1996 | Prete et al. | 363/17 |
| 5,633,793 A | * | 5/1997 | Lee et al. | 363/127 |
| 5,684,683 A | * | 11/1997 | Divan et al. | 363/65 |
| 5,771,163 A | * | 6/1998 | Moriguchi et al. | 363/71 |
| 6,104,624 A | * | 8/2000 | Iwamoto et al. | 363/71 |

FOREIGN PATENT DOCUMENTS

| | | | |
|---|---|---|---|
| WO | WO01/03490 | 1/2001 | |
| WO | WO01/13519 | 2/2001 | .......... H03K/17/62 |

OTHER PUBLICATIONS

Kolar et al., Proceedings of the 21ˢᵗ INTELEC (International Telecommunications Energy Conference), Copenhagen, Denmark (Jun. 6–9, 1999).

Kolar et al., Proceedings of the 11ᵗʰ IEEE Applied Power Electronics Conference (APEC), San Jose, CA (Mar. 3–7, 1996).

Pages from IXYS Product Catalog (2000), pp. 1–3 & 1–4, Dec. 2000.

* cited by examiner

Primary Examiner—Jeffrey Sterrett
(74) Attorney, Agent, or Firm—McKenna & Cuneo LLP

(57) ABSTRACT

The invention relates to a method and apparatus for AC/DC conversion with continuous sinusoidal input currents, and a controlled isolated output voltage that shows one or more of the advantage of substantially reduced electromagnetic interference (EMI) noise and substantially reduced total harmonic distortion (THD). This power conversion system may, for example, incorporate the use of three-phase delta-connected inputs to further improve performance.

16 Claims, 3 Drawing Sheets

POWER CONVERSION SYSTEM AND METHOD OF POWER CONVERSION

BACKGROUND OF THE INVENTION

1. Field of Invention

The invention relates to a method and apparatus for AC/DC conversion with continuous sinusoidal input currents, and a controlled isolated output voltage that shows one or more of the advantages of substantially reduced electromagnetic interference (EMI) noise and substantially reduced total harmonic distortion (THD). This power conversion system may, for example, incorporate the use of three-phase delta-connected inputs to further improve performance.

2. Description of Prior Art

In many AC/DC power conversion systems (e.g., telecommunications power supplies) it is necessary either to reduce significantly or avoid total harmonic distortion (THD) of the input currents to achieve a power factor close to one. Thus today, instead of diode-rectifiers, with the need for heavy and expensive passive input filters, pulse-width modulated (PWM) rectifiers with active power factor correction (PFC) are often employed. Typically, boost-type rectifiers are used to ensure continuous input currents, resulting in an output voltage that is higher than the maximum line-to-line voltage at the AC-side. Because many applications require a small, controlled and isolated DC-output voltage, the power conversion system typically includes a second stage that is a DC/DC converter, in which the DC-link voltage is identical to the (relatively high) output-voltage of the AC/DC converter at the input side.

Emission of electromagnetic interference (EMI) due to common-mode disturbances, however, remains one of the problems of pulse-width modulated (PWM) rectifier systems. With boost-type pulse-width modulation the power switches of the rectifier system are switched at a significantly higher frequency than the mains frequency. The DC-(link) output voltage is lying across the input inductance of the according phase whenever the power switch is in the ON state. This makes the input current rise or fall, and the input current can thereby be effectively controlled. However, concurrently the output voltage alternates between zero and maximum voltage at the switching frequency. Due to the high switching frequency and the high DC-(link) output voltage of the boost-type rectifier, the output side (which is the DC-link voltage of a two-stage system) resultantly has fault currents through parasitic stray capacitors that result in the emission of EMI-noise. The same is true for the DC/DC-stage that also employs pulse width modulation.

In prior art methods for AC/DC power conversion this problem of EMI-noise emission is solved by the use of bulky and expensive EMI-filters and shielding. An alternative method is to reduce the switching frequency. Reducing the switching frequency may reduce the EMI-noise, but would increase the THD, thus necessitating bulky and expensive input current filters. Other state of the art methods to reduce EMI in power conversion systems include complicated and expensive digital control systems (including so-called "soft-switching" techniques), and the use of special "zero-power transition" switches.

Today, state-of-the-art power factor correction (PFC) power conversion systems consist of two stages, in which the AC/DC input- and/or the DC/DC output-stage present blocking voltage stress of the power switches that is equal to the high DC-link voltage. In these systems, even one power switch showing blocking voltage stress equal to the DC-link voltage results in high EMI-noise emission of the whole power conversion system.

SUMMARY OF THE INVENTION

The invention herein provides an effective apparatus and method for reducing the expense and bulk of filtering and shielding necessitated by the EMI-noise of an AC/DC power conversion system, without increasing THD. This is accomplished by combining an AC/DC converter, which, due to its power circuit configuration, presents 50% of the DC-link voltage as blocking voltage, with a DC/DC converter, which due to its power circuit configuration, presents 50% of the DC-link voltage to each of its power switches.

The present invention includes a method of reducing electromagnetic interference (EMI) and/or total harmonic distortion (THD) during multiple stage AC to DC power conversion, which may include the step of converting AC to high voltage DC by means of a three-phase/switch/level boost type pulse-width modulation rectifier as well as the step of converting higher voltage DC to lower voltage DC by means of a system of partial DC to DC converters connected in series at their primary sides, and connected in parallel at their secondary sides. Additionally, one may add the step of filtering by means of common mode filters between converting AC to high voltage DC and converting the higher voltage DC to lower voltage DC to the method of the present invention. A further step one may add is filtering by means of common mode filters after converting higher voltage DC to lower voltage DC. Another step one may add is to repeat the step of converting higher voltage DC to lower voltage DC. Additionally, one may add the step of filtering by means of common mode filters between the repeated DC to DC conversion steps.

An other object of the present invention is to provide an AC to DC power conversion system which may include a first stage of a three-phase/switch/level boost type pulse width modulation rectifier that converts AC to high voltage DC, having outputs, and at the outputs, a second stage of a system of DC to DC converters connected to each other in series at their primary sides and connected to each other in parallel at their secondary sides. This DC to DC conversion may be accomplished by using half-bridge or full-bridge pulse-width modulation type DC to DC converters. In addition one may add a pair of common mode filters at the positive and negative outputs of the first stage, and also may add a pair of series connected capacitors connecting the positive input of the second stage to the neutral input of the second stage, and the neutral input of the second stage to the negative input of the second stage. In the alternative, one may simply add common filters to one or more of the outputs of the first stage.

A method of reducing total harmonic distortion during multiple stage AC to DC power conversion, which may include the step of converting AC to high voltage DC by means of a three-phase/switch/level boost type pulse-width modulation rectifier as well as the step of converting higher voltage DC to lower voltage DC by means of a system of partial DC to DC converters connected in series at their primary sides, and connected in parallel at their secondary sides. Additionally, one may add the step of inserting common mode filters between converting AC to high voltage DC and converting the higher voltage DC to lower voltage DC. A further step one may add is inserting common mode filters after converting higher voltage DC to lower voltage DC. Another step one may add is to repeat the step of converting higher voltage DC to lower voltage DC. A final step one may add is inserting common mode filters between the repeated DC to DC conversion steps.

The present invention in its several embodiments produces superior performance over state-of-the-art systems by minimizing cost, size, and complexity while reducing THD and EMI. The invention utilizes circuit configurations rather than complex control schemes to keep EMI and THD low, efficiently and simultaneously.

It is understood that both the foregoing general description and the following detailed description are exemplary and explanatory only and are not restrictive of the inventions claimed. The accompanying drawings illustrate several embodiments of the invention and together with the description serve to explain the principles of the invention.

DETAILED DESCRIPTION

Reference will now be made in detail to the present preferred or exemplary embodiments of the invention, examples of which are illustrated in the accompanying drawings.

The invention herein provides a method and apparatus that combine a state-of-the-art PFC three-phase/level/switch PWM boost-type rectifier, in which the power circuit configuration presents a blocking voltage stress of, for example, approximately 50% of the DC-link voltage, with a DC/DC converter system, in which also the power circuit configuration presents a blocking voltage stress of, for example, approximately 50% of the DC-link voltage.

The DC/DC converter, of the present invention, may, for example, consist of two or more partial DC/DC converter systems that are connected at their primary sides in series so that each partial system faces only a portion (one-half in the case of two partial systems) of the DC-link voltage at its primary side. Therefore, the maximum blocking voltage of all power switches at the primary sides of the two partial DC/DC converters can be reduced to approximately one-half of the DC-link voltage resulting in a corresponding reduction in the emitted EMI-noise from the parasitic stray capacitors connecting the primary windings of the two partial DC/DC converters to the mains star point.

This combination of partial power conversion systems may, for example, ensure that substantially all the power switches of the apparatus face approximately 50% of the blocking voltage compared to the DC-link voltage, and the total EMI-noise of the apparatus may, therefore, be consequently reduced by approximately 50% when compared to state-of-the-art single-stage and two-stage PFC AC/DC power conversion systems (such as, for example, six-switch two-level AC to DC converters). Because of this reduction of the EMI-noise of the apparatus, which results from the described combination of at least one embodiment of the power circuits of the partial systems, the subsequent filtering and shielding effort for the power conversion system is reduced significantly, without an increase in THD.

Figure 1:
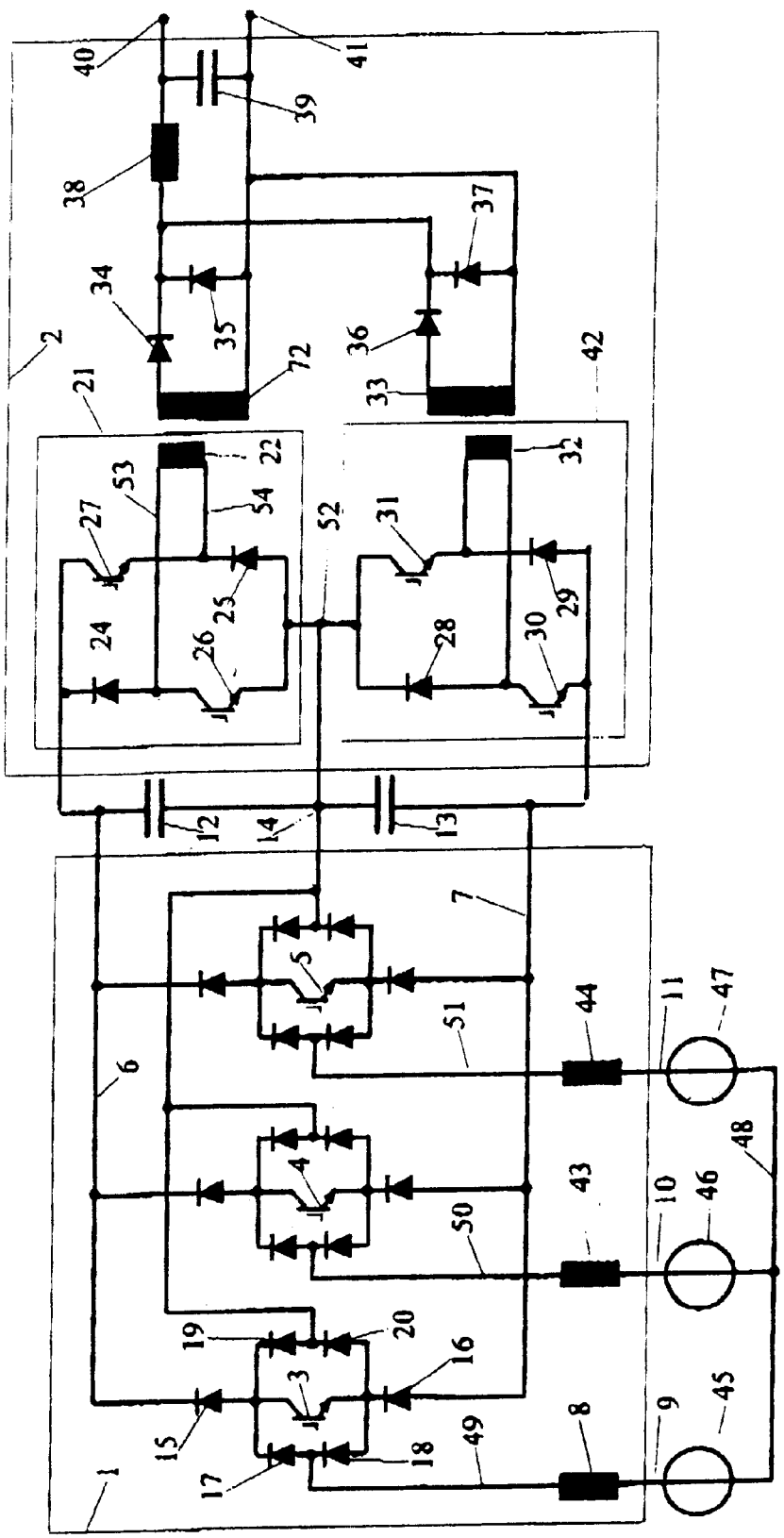
FIG. 1 is a schematic diagram of a preferred embodiment of the present invention.

One preferred embodiment of the present invention is diagramed in FIG. 1. The apparatus for AC/DC power conversion with power factor correction and isolated controlled output voltage with reduced emission of EMI-noise (a Vienna rectifier) (see, for example, Kolar et al., 96(2) PROC. IEEE-PESC 1329–36 (1996)) comprises a three-phase/three-level/three-switch PWM boost-type rectifier 1 that is connected in series with a DC/DC converter 2 with high frequency isolation, where this DC/DC converter 2 consists, for example, of two partial systems 21 and 42 connected in series at their primary sides.

The terminals 9, 10, 11 connect the AC/DC converter 1 to a three-phase input voltage system 45, 46, 47 with a mains star point 48. The output of the AC/DC converter 1 is formed by a series connection of two output capacitors 12 and 13 that connect the positive terminal 6 with the negative terminal 7, defining a neutral point 14 that can be connected directly to the converter input terminals 49, 50, 51 by closing the power switches 3, 4, 5. The partial output voltage between the positive terminal 6 and the neutral point 14 is approximately equal to the partial voltage between the neutral point 14 and the negative terminal 7. Therefore, the output voltage between the positive terminal 6 and the negative terminal 7 is the DC-link voltage of the two-stage power conversion system and is twice the partial output voltages.

For the condition where positive input current is flowing through the input inductor 8, into the AC/DC converter 1 and the power switch 3 of the corresponding phase is in the OFF state, the current through the inductor 8 flows via the diodes 17 and 15 into the positive terminal 6, while the diodes 18, 19, 20 are in the OFF state. The blocking voltage of the power switch 3 is defined by the partial output voltage between positive terminal 6 and neutral point 14 because an increasing blocking voltage stress introduces a leakage current through the power switch 3 that opens diode 20 that is clamping the blocking voltage to the partial output voltage across the partial output capacitor 12.

For the condition where negative input current is flowing through the input inductor 8 and the power switch 3 is in the OFF state, the maximum blocking voltage stress of the power switch 3 is clamped by the diode 19 to the partial output voltage across the capacitor 13.

For the condition where positive input current is flowing through the input inductor 8 into the AC/DC converter 1 and the power switch 3 is in the OFF state, the converter input terminal 49 is connected to the positive terminal 6 via the diodes 15 and 17.

For the condition where power switch 3 is in the ON state the converter input terminal 49 is connected to the neutral point 14 via the power switch 3 and the diodes 17 and 20, regardless of the polarity of the input current through inductor 8. Therefore, switching the power switch 3 from the OFF state into the ON state reduces the voltage potential of the converter input terminal 49 by the voltage blocking stress of the power switch 3, which is equal to half of the DC-link voltage between the positive terminal 6 and the negative terminal 7.

Changes of the voltages of the terminals 6, 7, 14 by one-half of the DC-link voltage with switching frequency result in fault currents through parasitic stray capacitors (not shown in FIG. 1, because they are merely models of unavoidable non-idealities that exist in the materials of the circuit) connecting the terminals 6, 7, 14 of the DC-link with the mains star point 48 of the input voltage system 45, 46, 47, and these fault currents are described as EMI-noise. Because the blocking voltage of power switches 3, 4, 5 is limited to half of the DC-link voltage, the EMI-noise emitted by the AC/DC converter 1 can also be reduced correspondingly.

To gain substantial EMI noise emission reduction, such as, for example, the advantage of approximately 50%-reduced EMI-noise emission for the whole power conversion system, compared to state-of-the-art systems (such as for example, systems comprising a six-switch two-level AC to DC converter or a single DC to DC converter), a power system comprising the AC/DC converter 1 may be, for example, connected to the DC/DC converter 2. The primary side of the DC/DC converter 2 comprises via terminal 52 a series connection of the primary sides of two partial converter systems 21 and 42. The secondary sides of the partial systems 21 and 42 are connected in parallel via the output inductor 38 that forms an output filter together with the output capacitor 39.

Because terminal 52 is connected to the neutral point 14, in this embodiment of the present invention, the partial input voltages of the capacitors 12 and 13 are impressed as input voltages of the partial DC/DC converter systems 21 and 42. The maximum blocking voltages of the power switches 26 and 27 of the partial system 21 and the power switches 30 and 31 of the partial system 42, respectively, are limited to the partial output voltage between the positive terminal 6 and the neutral point 14, and the neutral point 14 and the negative terminal 7, which is always half of the DC-link voltage.

For the condition where both power switches 26 and 27 of the partial system 21 are in the ON state, the terminal 54 of the primary winding 22, for this embodiment, is connected to the positive terminal 6, and the terminal 53 of the primary winding 22 is connected to the terminal 52 and, thus, to the neutral point 14.

For the condition where both power switches 26 and 27 of the partial system 21 are in the OFF state, the diodes 24 and 25 are in free-wheeling state so that the terminal 53 of the primary winding 22 is connected to the positive terminal 6, and the terminal 54 of the primary winding 22 is connected to the terminal 52 and the neutral point 14.

The change between the ON state and the OFF state of both power switches 26 and 27 changes the voltage potential between the terminals 53 and 54 of the primary winding 22 with the switching frequency by the maximum blocking voltage stress of the power switches 26 and 27 of the partial system 21. This blocking voltage stress is equal to half of the DC-link voltage between positive terminal 6 and negative terminal 7. The parasitic stray capacitors (not shown in FIG. 1, because they are merely models of unavoidable non-idealities that exist in the materials of the circuit) connecting the terminals 53 and 54 of the winding 22 with the mains star point 48 introduce fault currents that result in the emission of EMI-noise. The same process of switching occurs in the partial system 42 attached to the winding 32, and the analysis presented above can therefore be applied.

Due to the structure of the DC/DC converter 2 when comprising two partial DC/DC converters 21 and 42 connected in series at their primary sides, the blocking voltage of all power switches 26, 27, 30, 31 and therefore the EMI-noise emission of the DC/DC-converter 2, can be reduced to approximately 50%, by comparison to the state-of-the-art systems (such as, for example, systems consisting of a single DC to DC converter) with blocking voltage stress of the power switches equal to the DC-link voltage between the terminals 6 and 7.

Figure 2:
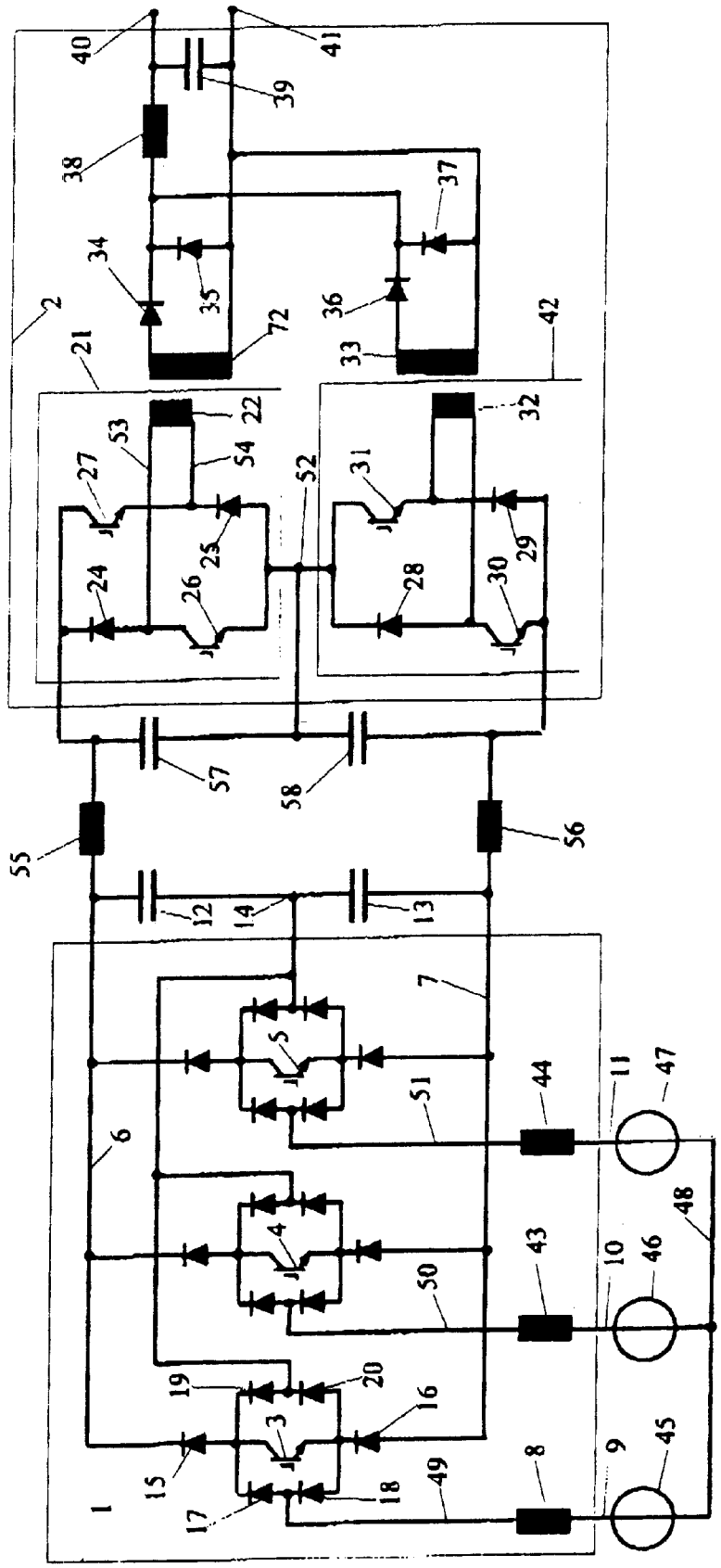
FIG. 2 is a schematic diagram of another preferred embodiment of the present invention.

In another preferred embodiment of the present invention, as shown in FIG. 2, the AC/DC converter 1 and the DC/DC converter 2 can be, for example, connected by means of a common-mode filter-inductor 55, 56. In addition, the input side of the DC/DC converter 2 can be, for example, formed by a series-connection of two capacitors 57 and 58 that define a neutral point 52 of the DC/DC converter 2 that is not connected to the neutral point 14 of the AC/DC converter 1. The DC-link capacitors 12 and 13 may define the output of the AC/DC converter 1.

Figure 3:
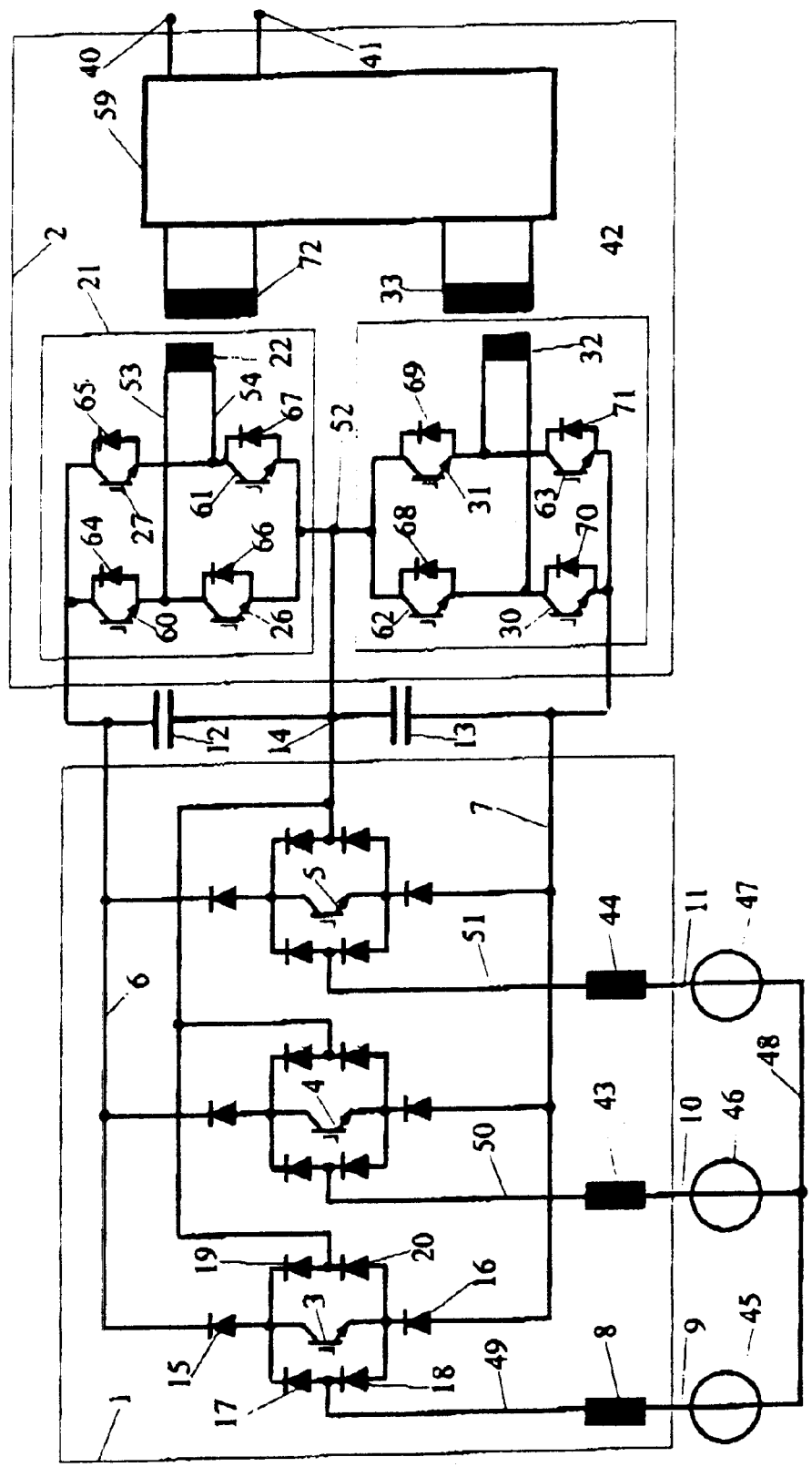
FIG. 3 is a schematic diagram of a further preferred embodiment of the present invention.

In a further embodiment of the present invention as, for example, shown in FIG. 3 the two partial systems 21 and 42 of the DC/DC converter 2 can be realized at their primary sides by full bridge legs comprising the power switches 26, 27, 60, 61 with the free-wheeling diodes 64, 65, 66, 67 of the partial system 21, and the power switches 30, 31, 62, 63 with the free-wheeling diodes 68, 69, 70, 71 of the partial system 42, respectively. The terminal 52 that connects the two partial systems 21 and 42 in series is connected to the neutral point 14 so that all power switches 26, 27, 60, 61, 30, 31, 62, 63 face a maximum blocking voltage of half of the DC-link voltage occurring between the positive terminal 6 and the negative terminal 7. The secondary sides of the partial systems with the windings 72 and 33 are connected in a parallel-connection to define a controlled and isolated output voltage between the terminals 40 and 41.

Although the present invention has been described with reference to preferred embodiments, those skilled in the art will recognize the changes may be made in form and detail without departing from the spirit and scope of the invention. In particular, one skilled in the art will recognize that while the description has been made with reference to three-phase AC inputs, the same method can be applied, with trivial changes to the AC/DC stage, to the conversion of power with single-phase or other multiple-phase AC inputs.

What is claimed is:

1. A method of reducing electromagnetic interference during multiple stage AC to DC power conversion comprising the steps of
    converting AC to high voltage DC by means of a three-phase/switch/level boost type pulse-width modulation rectifier; and
    converting higher voltage DC to lower voltage DC by means of a system of partial DC to DC converters connected in series at their primary sides, and connected in parallel at their secondary sides.

2. The method of claim 1 further comprising the step of filtering by means of common mode filters between converting the AC to high voltage DC and converting the higher voltage DC to lower voltage DC.

3. The method of claim 1 further comprising the step of filtering by means of common mode filters after converting higher voltage DC to lower voltage DC.

4. The method of claim 1 further comprising the step of repeating the conversion of higher voltage DC to lower voltage DC.

5. The method of claim 4 further comprising the step of filtering by means of common mode filters between the repeated conversion of DC to DC.

6. An AC to DC power conversion system comprising
    a first stage comprising a three phase/switch/level boost type pulse width modulation rectifier that converts AC to high voltage DC, said rectifier having two or more outputs; and at said outputs
    a second stage comprising a system of DC to DC converters connected to each other in series at their primary sides and connected to each other in parallel at their secondary sides.

7. The power conversion system of claim 6 wherein said DC to DC converters are half-bridge pulse-width modulation type DC to DC converters connected in series at their primary sides and connected to each other in parallel at their secondary sides.

8. The power conversion system of claim 6 wherein said DC to DC converters are full-bridge pulse-width modulation type DC to DC converters connected in series at their primary sides and connected to each other in parallel at their secondary sides.

9. The power conversion system of claim 6 further comprising between the two stages, a pair of common mode filters connecting the high voltage output and low voltage output of the first stage with the positive input terminal and negative input terminal of the second stage; and a pair of series connected capacitors connecting the positive input terminal of the second stage, first to the neutral input terminal and then to the negative input terminal.

10. The power conversion system of claim 6 wherein said outputs of the rectifier further comprise common mode filters.

11. A method of reducing electromagnetic interference and total harmonic distortion in AC-DC power conversion comprising the steps of providing a source of AC power;

providing an apparatus comprising
      a first stage comprising a three phase/switch/level boost type pulse width modulation rectifier that converts AC to high voltage DC, said rectifier having two or more outputs; and at two or more said outputs
      a second stage comprising a system of DC to DC converters connected to each other in series at their primary sides and connected to each other in parallel at their secondary sides; and converting said AC power to DC by means of said apparatus.

12. A method of reducing total harmonic distortion during multiple stage AC to DC power conversion comprising the steps of converting AC to high voltage DC by means of a three-phase/switch/level boost type pulse-width modulation rectifier; and converting higher voltage DC to lower voltage DC by means of a system of partial DC to DC converters connected in series at their primary sides, and in parallel at their secondary sides.

13. The method of claim 12 further comprising the step of filtering by means of common mode filters between converting the AC to high voltage DC and converting the higher voltage DC to lower voltage DC.

14. The method of claim 12 further comprising the step of filtering by means of common mode filters after converting higher voltage DC to lower voltage DC.

15. The method of claim 12 further comprising the step of repeating the conversion of higher voltage DC to lower voltage DC.

16. The method of claim 15 further comprising the step of filtering by means of common mode filters between the repeated conversion of DC to DC.

* * * * *